April 8, 1952 R. E. HANSON 2,591,809
APPARATUS FOR WELDING SEAMS IN CYLINDRICAL VESSELS
Filed July 25, 1949 2 SHEETS—SHEET 1
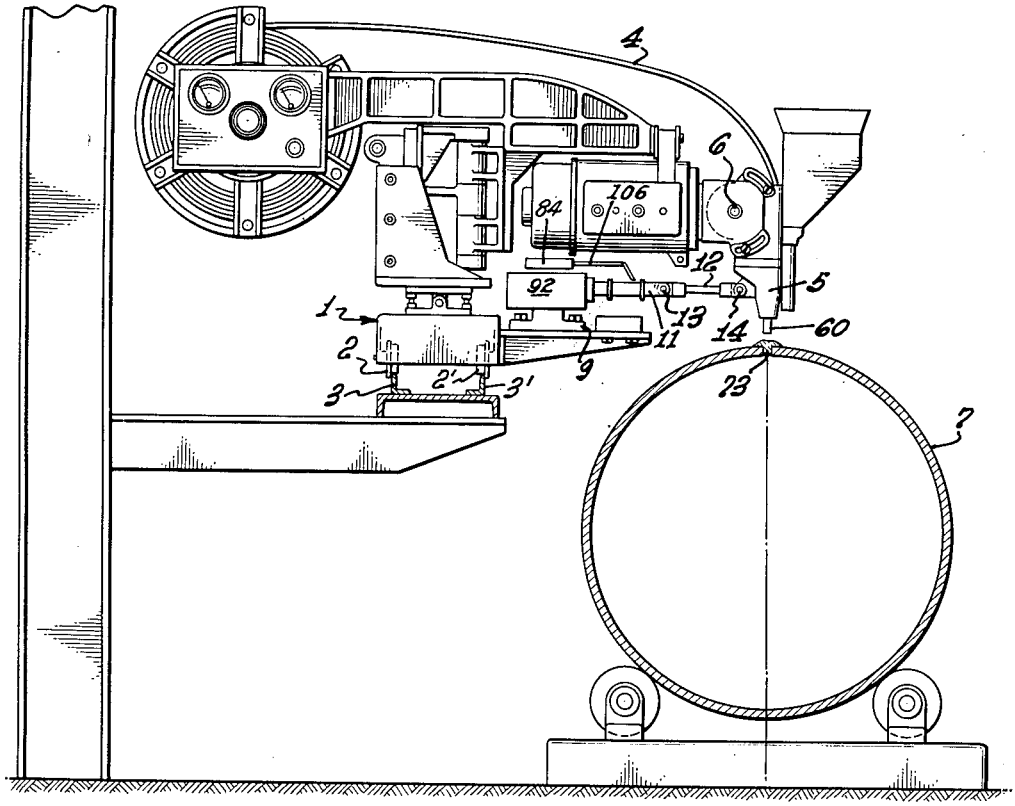
Fig. 1.
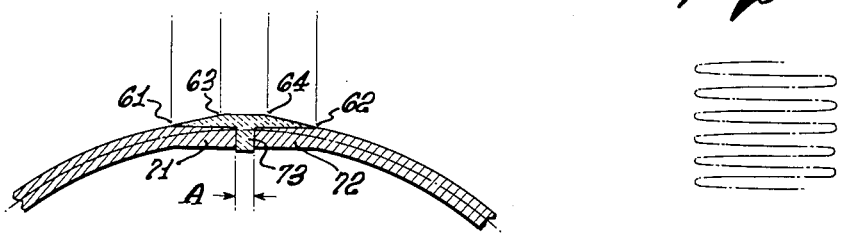
Fig. 2.
Fig. 3.
INVENTOR.
Roy E. Hanson,
BY
ATTORNEY.

April 8, 1952  R. E. HANSON  2,591,809
APPARATUS FOR WELDING SEAMS IN CYLINDRICAL VESSELS
Filed July 25, 1949  2 SHEETS—SHEET 2

INVENTOR.
ROY E. HANSON,
BY
ATTORNEY.

Patented Apr. 8, 1952

2,591,809

UNITED STATES PATENT OFFICE 2,591,809

APPARATUS FOR WELDING SEAMS IN CYLINDRICAL VESSELS

Roy E. Hanson, Altadena, Calif.

Application July 25, 1949, Serial No. 106,665

2 Claims. (Cl. 219—8)

My invention relates generally to welding and more particularly to the welding of a seam in fabricating a cylindrical object from steel plate.

Codes prescribed by the American Petroleum Institute and the American Society of Mechanical Engineers lay down certain joint efficiency factors to be used in computing the allowable stress to which pressure vessels having a welded seam may be subjected. Such joint efficiency factors are in all cases less than unity and represent penalties for the use of welded construction, since for any given working pressure the thickness of parent metal must be greater for welded construction than if the cylindrical body of the vessel were made of seamless metal.

The joint efficiency factor for any given type of joint and composition of parent metal can be increased by making an X-ray analysis of the joint or by stress relieving. Such processes are commercially impracticable for many industrial purposes because of their higher cost. Seamless construction is a possible alternative, but it likewise increases manufacturing costs unduly for many types of construction.

The disadvantages described above are avoided by my invention which has for its principal object the disclosure of an improved apparatus for welding the opposed edges of metal plate in fabricating cylindrical bodies.

Another object is to disclose such an apparatus adapted to weld a seam in cylindrical pressure vessels using parent metal of a thinner gage than is possible under existing codes of safe welding practice.

Another object of my invention is to disclose an apparatus for such welding which will insure that the center line of stresses virtually coincides with the physical center line of the joint with the result that there is developed in the joint no appreciable bending moment which might cause cracks and eventual failure of the joint.

A further object is to disclose an apparatus having the above characteristics and adapted for use with a conventional automatic welding machine.

These and other objects and purposes will become clear from the study of the following specification and the accompanying drawings, in which:

Fig. 1 is a side elevational view of a welding machine incorporating one embodiment of my invention with the tank being welded shown in cross-section.

Fig. 2 is an enlarged transverse sectional view through a seam welded in accordance with my invention.

Fig. 3 is a diagrammatic representation in plan of the path of the welding electrode in accordance with my invention.

Figure 4:
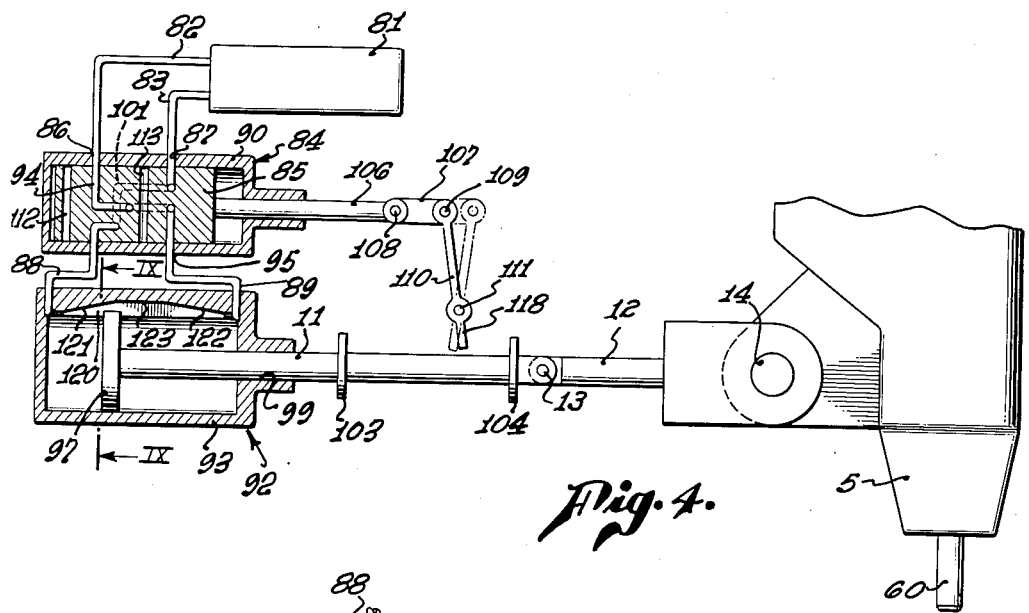
Fig. 4 is a side elevational view, partly diagrammatic, of an embodiment of my invention.

In general, my invention is adapted to be used in conjunction with an automatic welder of well-known design using the so-called "shielded arc" process, and contemplates the use of an oscillating welding electrode. Such oscillations take place in a plane transverse to the seam being welded.

Referring in detail to the drawings, electrode carriage 1 is mounted so as to be longitudinally movable on wheels 2 and 2' resting on guide rails 3 and 3'. The mechanism associated with the longitudinal travel of the electrode carriage is not shown in detail in the drawings since it forms no part of the present invention. Electrode carriage 1 is arranged for uniform movement on rails 3 and 3' at a speed selectively adjustable by the operator.

In forming metal plate into cylindrical shape preparatory to welding the longitudinal seam, marginal portions of metal adjacent the edges to be welded together are normally left flattened, as is most clearly seen at 71 and 72 in Fig. 2. In welding in accordance with my invention, flattened portions 71 and 72 are positioned so that they lie in a common flat plane, and their opposing edges may touch one another or be spaced slightly apart in conformance with the several welding techniques well known to those skilled in the art.

The illustrative sectional view in Fig. 2 shows the opposing edges spaced apart a distance "A," and under some conditions distance "A" may be zero. It is to be understood that my invention is equally applicable whether or not "A" is zero. An initial conventional welding pass is then made along the abutting edges of metal plate 7, depositing metal between said abutting edges as indicated by character 73. When appropriate, an additional conventional welding pass may be made, in accordance with welding techniques familiar to those skilled in the art. Alternatively, if distance "A" is zero and a carbon electrode is used, no metal will be deposited during the first pass or first two conventional passes and marginal portions 71 and 72 will be welded directly together.

Welding rod 4 is fed in a conventional manner at a substantially uniform speed into welding head 5. Welding head 5 is arranged for pivotal movement around axis 6. Movement of the welding head in a direction transverse to the axis of cylindrical tank 7 is accomplished by the hydraulic cylinder 92, rod 11 and link 12. The link is provided at either end with a pivotal connection 13 and 14 to rod 11 and to welding head 5, respectively. The hydraulic cylinder 92 is controlled by a valve 84 supplied with pressure fluid from a suitable source, as is disclosed in more detail in Figs. 4 and 5.

The reciprocating motion of the welding head and welding rod in a plane transverse to the seam to be welded is not carried out at constant speed, but instead, means are provided for causing the welding head to move at a relatively slow, constant rate during the central part of a swing and at a progressively changing rate during the outer portions of travel, with maximum speed being attained at the outermost limits of its travel. The effect of such motion, during welding, is illustrated in Fig. 2, wherein 61 and 62 represent the outermost limits of transverse travel and the space between 63 and 64 represents the central portion of relatively slow constant speed. It will be noted that a heavy deposit of welding metal, uniform in thickness, is obtained within the zone 63—64 above the seam 73, the welding metal then tapering in both directions toward the edges 61 and 62, where the welding metal is, in effect, feathered into the pipe or sheet steel, producing a joint which is free from abrupt changes in cross-sectional area and which is exceptionally strong and stable. The distance between 63 and 64 may be about one-third of the total width of the weld or one-third of the distance separating 61 and 62.

During each swing or oscillation of the welding head, relative motion of the tank and welding head also takes place in a direction parallel with the seam. As a result, the combined motions produce a path of travel of the welding rod similar to that shown in Fig. 3.

Since it is necessary, in order to minimize bending stresses in the finished weld, to provide metal both above and below the center line of the complete weld, it will be noted that adjacent edge portions 71 and 72 of the sheet metal to be welded have been deformed prior to welding in order to make them lie in a common plane. These deformed portions are of substantially the same length circumferentially as the width of the metal deposited during welding. Thus a substantial amount of metal is provided below the center line of the joint and the center line of stresses is made to virtually coincide with the center line of the welded joint.

Figure 5:
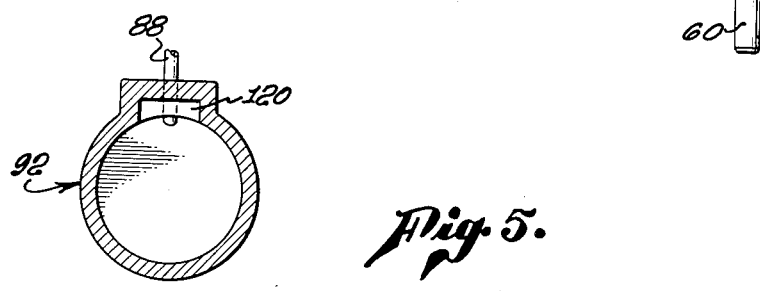
Fig. 5 is a sectional view taken on line IX—IX of Fig. 8.

In an embodiment of my invention illustrated in Fig. 4 a hydraulic system is made to provide the desired oscillatory motion of welding head 5.

A fluid pump, preferably an oil pump, is shown generally at 81. Two conduits, 82 and 83, communicate with pump 81, conduit 82 carrying the outgoing fluid under pressure and conduit 83 being the return line. A reversing valve, indicated generally at 84, comprises valve housing 90 and slide valve 85 slidably mounted therein. Valve housing 90 is provided on one wall with ports 86 and 87 communicating respectively with conduits 82 and 83. Slide valve 85 is arranged to cause fluid under pressure from conduit 82 to flow either into conduit 88 or conduit 89, the last two named conduits communicating reversing valve 84 with a cylinder and piston assembly indicated generally at 92.

In the position of slide valve 85 shown in Fig. 4, fluid under pressure supplied through conduit 82 will travel through channel 94 formed in slide valve 85 and will thus communicate with port 95 formed in the wall of housing 90, said port 95 communicating with conduit 89 leading to piston and cylinder assembly 92. Assembly 92 includes cylindrical housing 93, piston 97 and piston rod 11. Piston 97 is arranged for sliding motion within cylindrical housing 93 and this motion is communicated by piston rod 11 which passes through opening 99 formed in an end wall of cylindrical housing 93. Thus fluid under pressure supplied to the right side of cylindrical housing 93 forces piston 97 and piston rod 11 leftwardly as indicated by the arrow. Fluid being displaced ahead of piston 97 is returned to fluid pump 81 through conduit 88, channel 101, and conduit 83.

Fixed to piston rod 11 are stops 103 and 104. Projecting outwardly from reversing valve 84 and fixed to slide valve 85 is slide valve arm 106 connected by link 107 and pivotal connections 108 and 109 to reversing lever 110, which is pivoted at 111. The end 118 of reversing lever 110 distant from pivotal connection 109 is arranged to be actuated by stops 103 and 104.

When piston 97 is moving leftwardly as described previously, stop 104 will strike end 118 of reversing lever 110 as piston 97 reaches the limit of its leftward travel. Slide valve 85 is thereby moved rightwardly so that the supply of fluid under pressure in conduit 82 is made to flow through channel 112 formed in slide valve 85. Fluid under pressure is then caused to exert force on piston 97 from the left so that piston 97 will be urged rightwardly within cylinder 93. Fluid on the right of piston 97 is forced out of cylinder 93 through conduit 89, port 95, channel 113 and return conduit 83 to fluid pump 81. Stop 103 is so positioned on piston rod 11 that when piston 97 reaches its extreme rightward position, stop 103 will actuate reversing lever 110, thereby moving slide valve 85 leftwardly to the position shown in Fig. 4. Piston 97 will then be urged leftwardly and the cycle of operation is repeated. A reciprocating or oscillatory motion is thus transmitted from piston 97 through piston rod 11, link 12 and pivotal connections 13 and 14 to welding head 5.

Cylindrical housing 93 is provided with a keywaylike slot 120 extending longitudinally substantially the entire length of the cylinder. The depth of slot 120, as shown in Fig. 4, is uniform in the central portion of its length and is tapered uniformly on either side of the central portion, the depth being zero at each of its ends. Slot 120 acts as a by-pass for fluid acting on piston 97, and it can be seen that a constant amount of fluid is allowed to by-pass piston 97 during the central portion of the piston's travel and a progressively smaller amount is allowed to by-pass piston 97 as the piston moves closer to the outermost limits of its travel. Thus piston 97 will move at a constant rate during the central portion of its travel and at a substantially uniformly changing rate in the outer portions of its travel.

It will be noted that the smallest amount of liquid is permitted to by-pass piston 97 at the outermost limits of its travel, so that the piston is at those two positions moving at its maximum speed in a direction transverse to the seam being welded.

Modifications and changes in the exemplary forms of my invention described and illustrated herein will suggest themselves to those skilled in the art. Such changes within the scope of my invention are intended to be embraced by the appended claims.

I claim:

1. In an apparatus for welding a longitudinal seam in a cylinder formed of metal plate, an electrode carriage arranged for linear movement parallel to the seam to be welded, a welding head pivotally suspended from said carriage and carrying a welding electrode at its free end, and means for imparting reciprocating motion to the welding head in a plane transverse to said seam, said means including a cylinder having a longitudinal slot formed in the inner wall thereof and a piston slidably mounted for reciprocating travel within the cylinder and provided with a piston rod connected to said welding head, said slot being of substantially uniform depth throughout the central approximately one-third of the travel of the piston and of progressively diminishing depth in each longitudinal direction from said central one-third.

2. In an apparatus for welding a longitudinal seam, a welding carriage arranged for linear movement parallel to a seam to be welded, a welding head carried by said carriage and means for imparting reciprocating motion to the welding head in a direction virtually transverse to the seam and extending an equal distance on either side of the seam, said means including a cylinder, a piston slidably mounted within the cylinder and provided with a piston rod connected to the welding head, a by-pass slot formed in the cylinder having a substantially constant depth in its central portion and a progressively diminishing depth in either longitudinal direction from the central portion, a source of fluid under pressure, a reversing valve and fluid conduits interconnecting the source of fluid, the reversing valve and the cylinder.

ROY E. HANSON.

REFERENCES CITED

The following references are of record in the file of this patent:

UNITED STATES PATENTS

| Number | Name | Date |
|---|---|---|
| 1,646,369 | Gommel | Oct. 18, 1927 |
| 1,667,585 | Chapman | Apr. 24, 1928 |
| 1,933,340 | Raymond | Oct. 31, 1933 |
| 2,477,108 | Young | July 26, 1949 |

FOREIGN PATENTS

| Number | Country | Date |
|---|---|---|
| 596,469 | Germany | May 2, 1934 |
| 453,590 | Great Britain | Dec. 10, 1934 |